(12) United States Patent
Blomqvist et al.

(10) Patent No.: US 12,508,655 B2
(45) Date of Patent: *Dec. 30, 2025

(54) CUTTING TOOL

(71) Applicant: AB SANDVIK COROMANT, Sandviken (SE)

(72) Inventors: Andreas Blomqvist, Stockholm (SE); Jose Luis Garcia, Stockholm (SE); Erik Holmstrom, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 299 days.

This patent is subject to a terminal disclaimer.

(21) Appl. No.: 17/787,429

(22) PCT Filed: Dec. 17, 2020

(86) PCT No.: PCT/EP2020/086735
§ 371 (c)(1),
(2) Date: Jun. 20, 2022

(87) PCT Pub. No.: WO2021/122970
PCT Pub. Date: Jun. 24, 2021

(65) Prior Publication Data
US 2023/0040103 A1    Feb. 9, 2023

(30) Foreign Application Priority Data
Dec. 20, 2019 (EP) .................... 19218943

(51) Int. Cl.
B23B 27/14 (2006.01)
B24C 1/10 (2006.01)
C22C 29/08 (2006.01)

(52) U.S. Cl.
CPC .............. *B23B 27/148* (2013.01); *B24C 1/10* (2013.01); *C22C 29/08* (2013.01);
(Continued)

(58) Field of Classification Search
None
See application file for complete search history.

(56) References Cited

U.S. PATENT DOCUMENTS 3,573,023 A    3/1971  Thomas et al.
2008/0166192 A1* 7/2008 Akesson ............... C23C 28/042
                                                407/119

FOREIGN PATENT DOCUMENTS

CN    1268192 A     9/2000
CN    101018879 A   8/2007
(Continued)

OTHER PUBLICATIONS

"Sandvik Coromant Turning Insert: SCMT380932-XM 4335 Carbide", MSC, accessed Sep. 24, 2024, pp. 1-4, https://www.mscdirect.com/product/details/32592552 (Year: 2024).*
(Continued)

*Primary Examiner* — Seth Dumbris
(74) *Attorney, Agent, or Firm* — Corinne R. Gorski

(57) ABSTRACT

A cutting tool includes a substrate of cemented carbide having hard constituents in a metallic binder. The hard constituents include WC. The WC content in the cemented carbide is 80-95 wt %. The cemented carbide has a Fe+Ni+Co+Cr content of 3-13 wt %, an atomic ratio of $0.05<\mathrm{Fe}/(\mathrm{Fe}+\mathrm{Ni}+\mathrm{Co}+\mathrm{Cr})<0.35$, an atomic ratio of $0.05<\mathrm{Ni}/(\mathrm{Fe}+\mathrm{Ni}+\mathrm{Co}+\mathrm{Cr})<0.35$, an atomic ratio of $0.05<\mathrm{Co}/(\mathrm{Fe}+\mathrm{Ni}+\mathrm{Co}+\mathrm{Cr})<0.35$ and an atomic ratio of $0.05<\mathrm{Cr}/(\mathrm{Fe}+\mathrm{Ni}+\mathrm{Co}+\mathrm{Cr})<0.35$. The crack resistance W measured on the rake face of the cutting tool is at least 25% higher than the W measured on a cross section of the bulk area of the cutting tool.

15 Claims, 1 Drawing Sheet

(52) U.S. Cl.
CPC ....... *B23B 2222/28* (2013.01); *B23B 2224/04* (2013.01); *B23B 2224/24* (2013.01); *B23B 2224/28* (2013.01); *B23B 2224/32* (2013.01); *B23B 2224/36* (2013.01)

(56) References Cited

FOREIGN PATENT DOCUMENTS

| | | | |
|---|---|---|---|
| CN | 101318230 A | | 12/2008 |
| CN | 100556589 C | | 11/2009 |
| CN | 106435322 A | | 2/2017 |
| CN | 108367357 A | | 8/2018 |
| CN | 109161774 A | * | 1/2019 |
| CN | 109371307 A | | 2/2019 |
| JP | H07308859 A | | 11/1995 |

OTHER PUBLICATIONS

Wang et al. "Effect of shot peening on the residual stresses and microstructure of tungsten cemented carbide", Materials and Design 95, 2016, pp. 159-164.

Faksa Lukas et al: "Effect of shot peening on residual stresses and crack closure in CVD coated hard metal cutting inserts", International Journal of Refractory Metals and Hard Materials, vol. 82, Apr. 16, 2019, pp. 174-182.

* cited by examiner

CUTTING TOOL

RELATED APPLICATION DATA

This application is a § 371 National Stage Application of PCT International Application No. PCT/EP2020/086735 filed Dec. 17, 2020 claiming priority to EP 19218943.9 filed Dec. 20, 2019.

TECHNICAL FIELD

The present invention relates to a cutting tool of cemented carbide wherein the cemented carbide comprises a metal binder and hard constituents comprising WC. The crack resistance of the surface area of the cutting tool is higher than the crack resistance in the bulk area of the tool.

BACKGROUND

Cutting tools for metal cutting applications commonly comprise a substrate of cemented carbide. Cemented carbide is a material that shows both high hardness and high toughness and the performance in cutting applications have been successful for decades. To further improve the performance of the cutting tool it is known to coat the tool with a wear resistant coating. It is also known to treat the cutting tool in a process called post treatment, including steps such as wet blasting, dry blasting, edge brushing and/or polishing. These post treatment processes typically change the surface roughness of the cutting tool and/or the residual stresses in the surface area of the cutting tool.

Effects of shot peening of cemented carbide is described by Wang et al., "Effect of shot peening on the residual stresses and microstructure of tungsten cemented carbide", Materials and Design 95, year 2016, pages 159-164. It is shown that compressive residual stresses are induced in the surface layer, both in the Co and in the WC.

There is a continuous need of improving the life times and performance of cutting tools to save time in production and reduce the risks of failure due to broken cutting tools. There is also a need to reduce the amount of Co in the cemented carbide, and to find alternative cemented carbides that can compete with the traditional Co-containing cemented carbide in metal cutting performance.

SUMMARY OF THE INVENTION

It is an object of the present invention to provide a cutting tool with improved resistance to wear in metal cutting applications and it is also an object to provide a method of making the same. It is a further object of the present invention to provide a cutting tool with high resistance to chipping of a coating at the cutting edge. Another object is to provide a turning tool with increased resistance to chipping of the cutting edge and/or breakage of the cutting tool.

At least one of the objects have been achieved with the cutting tool of claim 1 and with the method of claim 12. Preferred embodiments are disclosed in the dependent claims.

The present invention relates to a cutting tool comprising a substrate of cemented carbide, wherein the cemented carbide comprises hard constituents in a metallic binder, wherein the hard constituents comprise WC and wherein the WC content in the cemented carbide is 80-95 wt %, and wherein the cemented carbide has a Fe+Ni+Co+Cr content of 3-13 wt % and an atomic ratio of 0.05<Fe/(Fe+Ni+Co+Cr)<0.35 and an atomic ratio of 0.05<Ni/(Fe+Ni+Co+Cr) <0.35 and an atomic ratio of 0.05<Co/(Fe+Ni+Co+Cr)<0.35 and an atomic ratio of 0.05<Cr/(Fe+Ni+Co+Cr)<0.35, said cutting tool comprises a rake face, a flank face and a cutting edge there between, and wherein crack resistance W is defined as $$W = \frac{P}{4a}$$

wherein P is the load 100*9.81N of a Vickers hardness indentation and a is the average crack length of each crack formed at the corners of the Vickers hardness indentation, wherein W as measured on the rake face of the cutting tool is at least 25% higher than the W as measured on a cross section of the bulk area of the cutting tool.

The composition range described above is such that the binder gets a large solution hardening effect, which gives high hardness which is good for abrasion resistance and plastic deformation resistance. However, to have good metal cutting properties, a good combination of toughness and plastic deformation resistance is required. Usually for most technical composite materials such as cemented carbide, an increase in toughness is associated with a decrease in hardness. It has unexpectedly been found that by treating the material with the specific composition range according to the invention, crack resistance of more than 25% higher on the rake face as compared to the bulk was achieved. Cracks that form in the cutting tool during metal cutting usually originate on the rake side of the cutting tool, and these cracks limit the tool life. Therefore, increasing the crack resistance on the rake face will prolong the tool life of cutting tools in metal cutting applications.

In one embodiment of the present invention the cemented carbide comprise x wt % Ni, y wt % Fe, z wt % Co and v wt % Cr and wherein 5<x+y+z+v<9. Cemented carbides within this range och binder content has a good combination of toughness and plastic deformation resistance for cutting tool applications. Depending on the metal cutting application, the amount of binder can be optimized by a person skilled in the art.

In one embodiment of the present invention the residual stress as measured in the surface area on the rake face of the cutting tool is compressive and >2000 MPa, preferably >2200 MPa, more preferably 2400-2800 MPa, wherein the stress measurement is made with X-ray diffraction and the $sin^2\psi$-method using the (2 1 1) reflection of WC. Compressive residual stresses inhibit the formation of cracks. Therefore, increasing the crack resistance on the rake face will prolong the tool life of cutting tools in metal cutting applications.

In one embodiment of the present invention the relation between the crack resistance W as measured on the rake face, W(rake), and the crack resistance W as measured in the flank, W(flank), is W(rake)/W(flank)>1.10. Cracks that form during metal cutting usually originate on the rake side of the cutting tool, therefore a good crack resistance on the rake face is of advantageous for metal cutting applications. Further, cutting tool production process will be relatively simple if only the rake face is to be shot peened, and the flank side is slightly less prone to crack.

In one embodiment of the present invention the hardness at the surface of the cutting tool is >1500 HV100, preferably >1600 HV100. An increased hardness in the surface area of the cutting tool, especially in the area of the cutting tool that is in contact with the work piece material during metal cutting applications, is advantageous in that the wear resistance of the cemented carbide is increased. Further, a coating applied on the substrate can withstand longer on a harder substrate and thereby increase the life time of the cutting tool.

In one embodiment of the present invention the cemented carbide has an atomic ratio of $0.2 < Fe/(Fe+Ni+Co+Cr) < 0.3$ and an atomic ratio of $0.2 < Ni/(Fe+Ni+Co+Cr) < 0.3$ and an atomic ratio of $0.2 < Co/(Fe+Ni+Co+Cr) < 0.3$ and an atomic ratio of $0.2 < Cr/(Fe+Ni+Co+Cr) < 0.3$. This composition range is such that the binder gets a near maximum solution hardening effect, which gives high hardness which is good for abrasion resistance and plastic deformation resistance.

In one embodiment of the present invention the WC grain size is homogeneous through the whole substrate. Non-homogenous WC-grain size could lead to crack initiation sites due to difference in thermomechanical properties of different zones.

In one embodiment of the present invention the average WC grain size is 0.2-10 µm, preferably 0.5-3 µm. In this range the grain size of WC is optimal for cemented carbide aimed at metal cutting inserts. Depending on the metal cutting application, the WC grain size can be optimized by a person skilled in the art.

In one embodiment of the present invention the cemented carbide further comprises one or more of Cu, W, Mo, Mn, Al, Si. These elements provide strengthening of the cemented carbide by solution hardening.

In one embodiment of the present invention the cemented carbide further comprises one or more of Ta, Nb, Ti, Zr, Hf, V. These elements are prone to form cubic carbides in the cemented carbide. A cutting tool with cubic carbides has an increased bulk high-temperature hardness.

These elements are also useful for the creation of a gradient zone depleted of such cubic carbides. A gradient zone depleted of such cubic carbides is advantageous in that it provides increase resistance to crack growth in the surface area while keeping a good bulk plastic deformation resistance which is advantageous for some turning inserts.

In one embodiment of the present invention the substrate of cemented carbide comprise a cubic phase and wherein the substrate of cemented carbide is provided with a surface zone depleted from said cubic phase, the thickness of the surface zone is 2-100 µm, preferably 3-70 µm, more preferably 8-35 µm.

In one embodiment of the present invention the substrate of cemented carbide is provided with a coating, preferably a coating comprising one or more layers selected from TiN, TiCN, TiC, TiAlN, $Al_2O_3$ and ZrCN, more preferably a coating with a thickness of 2-20 µm.

In one embodiment of the present invention the hardness in the surface area and the hardness in the bulk area of the cutting tool is the same within 10% deviation. A cemented carbide with homogeneous hardness in bulk versus surface is economical to produce on a large scale. A hard cemented carbide can then become more resistant to crack formation on the surface in accordance with the present invention.

The present invention relates to a method of treating a cutting tool comprising a cemented carbide substrate wherein the cemented carbide comprises hard constituents in a metallic binder, wherein the hard constituents comprise WC and wherein the WC content in the cemented carbide is 80-95 wt %, wherein the cemented carbide has a Fe+Ni+Co+Cr content of 3-13 wt % and an atomic ratio of $0.05 < Fe/(Fe+Ni+Co+Cr) < 0.35$ and an atomic ratio of $0.05 < Ni/(Fe+Ni+Co+Cr) < 0.35$ and an atomic ratio of $0.05 < Co/(Fe+Ni+Co+Cr) < 0.35$ and an atomic ratio of $0.05 < Cr/(Fe+Ni+Co+Cr) < 0.35$, wherein the cutting tool (1) is subjected to shot peening at a temperature of or above 100° C., preferably at a temperature of or above 200° C., more preferably at a temperature of between 200° C. and 600° C. The shot peening of the present invention is in one embodiment performed at an elevated temperature, and this temperature is herein defined as the temperature that the material (the portion of the cutting tool) that is shot peened is at during the shot peening. Several methods can be used to create the elevated temperature of the cutting tool portion, such as induction heating, resistance heating, pre-heating on a hot surface/oven, laser heating etc. The cutting tool can alternatively be heated in a separate step prior to the shot peening step.

The temperature is suitably measured on the substrate by any method suitable for measuring temperature. Preferably, an infrared temperature measurement device is used.

The portion of the substrate that is subjected to shot peening is at said temperature. It has unexpectedly been found that treating a cutting tool to shot peening when it is heated increases its crack resistance in the surface area which is an important property for increasing the lifetime of a cutting tool.

In one embodiment of the present invention the cutting tool (1) comprises a rake face (2), a flank face (3) and a cutting edge there between, and wherein said shot peening is performed at least on the rake face (2). Cracks that form in the cutting tool during metal cutting usually originate on the rake side of the cutting tool, and these cracks limits the tool life. Therefore, increasing the crack resistance on the rake face will prolong the tool life of cutting tools in metal cutting applications.

In one embodiment of the present invention an ER of at least a part of said cutting edge is between 10 µm and 50 µm, preferably between 20 µm and 40 µm. It has surprisingly been found that the cutting tools made according to present method is performing well on cutting tools with this ER.

In one embodiment of the present invention the shot peening is performed on heated cutting tools, the method comprises a step prior to the shot peening wherein said cutting tools are heated. To heat the cutting tools prior to the shot peening can be advantageous since it usually takes a longer time to heat than to apply shot peening.

In one embodiment of the present invention the method further comprises a step of shot blasting at least a portion of the cutting tool, wherein the step of shot blasting is performed subsequent to the shot peening. This is advantageous since shot blasting gives compressive stresses in the top part of the coating and this in combination with shot peening is advantageous for tool life.

Still other objects and features of the present invention will become apparent from the following detailed description.

DEFINITIONS

"Cemented carbide" is a material comprising hard constituents distributed in a continuous metallic binder, the hard constituents forming a skeleton embedded in a continuous metallic binder. The hard constituents mainly comprise WC. This kind of material has properties combining a high hardness from the hard constituents with a high toughness from the metallic binder and is suitable as a substrate material for metal cutting tools.

By the "composition of" or "content in" the cemented carbide is herein meant the average composition or the average content in the cemented carbide substrate. For example a gradient in the surface area, such as 15-30 μm from the surface of the substrate towards the bulk, with a locally higher metallic binder content does not change the average composition of the cemented carbide substrate of the cutting tool since the cutting tool is at least several mm in dimension.

The "metallic binder" of the cemented carbide can comprise other elements that are dissolved in the metallic binder during sintering, such as W and C originating from the WC. Depending on what other types of hard constituents that are present, also other elements can be dissolved in the binder.

By "cutting tool" is herein meant a cutting tool for metal cutting applications such as an insert, an end mill or a drill. The application areas can be turning, milling or drilling.

"ER" is a value of the edge rounding intended to indicate the sharpness of the edge. Larger values of ER represent a rougher shape of the cutting edge while a smaller value of ER represent a sharp cutting edge.

ER is herein defined as a value as calculated according to the following:
  put the cutting tool on a flat surface on its bearing surface or the corresponding surface of the cutting tool.
  align a first plane along the side of the cutting tool perpendicular to said flat surface, in contact with the edge to measure, for example along the flank face 3 of the cutting tool 1,
  align a second plane in parallel with said flat surface and intersecting at an intersection point said first plane, said second plane being in contact with the edge to measure at a contact point, for example said second plane is aligned along the rake face 2 of the cutting tool 1.

Figure 1:
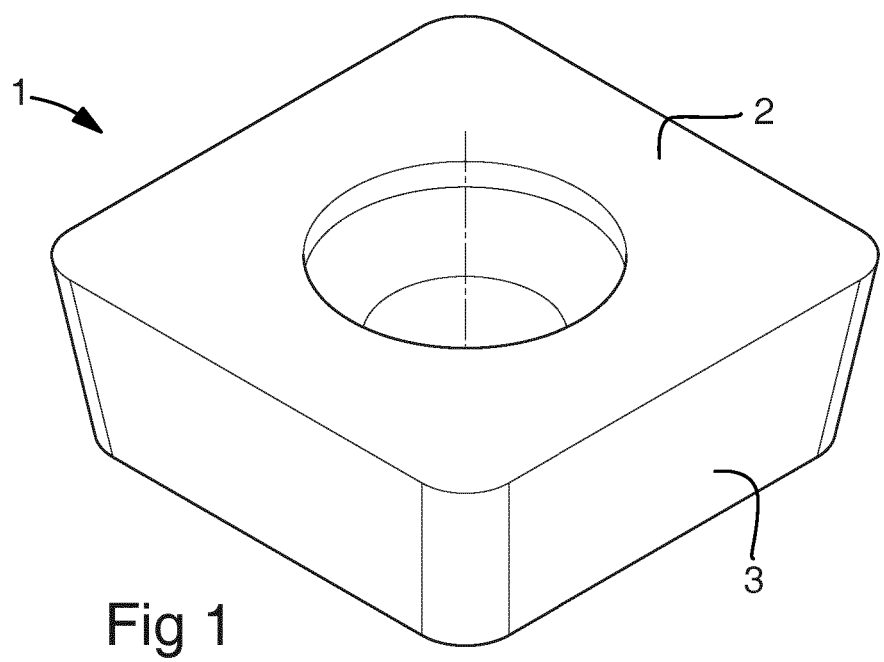
FIG. 1 is a general view of a cutting tool insert 1, provided with a rake face 2, a flank face 3 and cutting edge provided there between, and FIG. 2 is a general view of a cross section of a cutting edge wherein the edge rounding, ER, is indicated and also the width, A, of the cutting edge is shown schematically.
Figure 2:
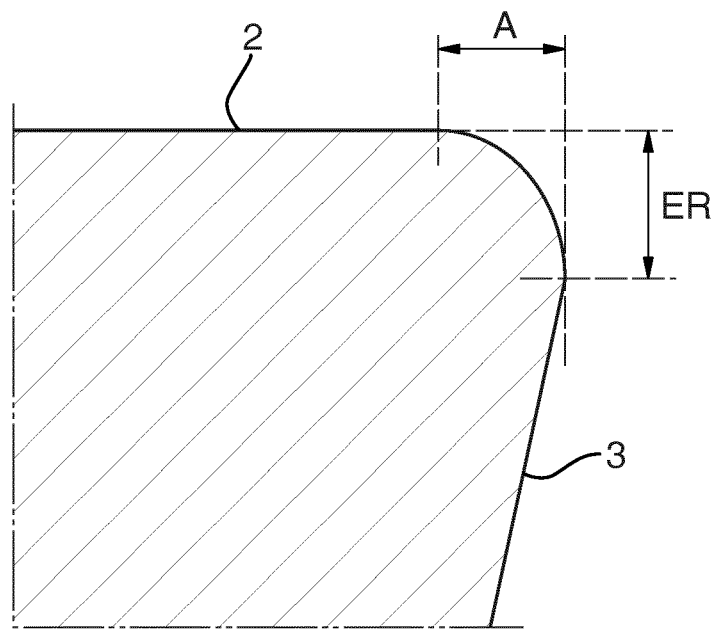

The value "ER" is equal to the distance between the intersection point between the first and the second plane and the point of contact between the first plane and the cutting tool, close to the edge, see FIG. 2.

"Shot blasting" is herein denoted a process using abrasive grains wherein material typically is removed from the treated surface by abrasive wear. Shot blasting is well known in the field of cutting tools and is for example known to introduce residual stresses in a coating on a cutting tool.

By "Shot peening" is herein meant that the surface of a cutting tool is bombarded with a media comprising particles, so called beads, that are non-abrasive and that typically have a round shape. The media can be beads of a hard material such as an oxide, steel or cemented carbide.

By the term "bulk" is herein meant the innermost part (centre) of the cutting tool.

By the term "surface area" is herein meant the outer portion of the substrate which is influenced by the shot peening process disclosed herein.

Further Embodiments of the Invention

In one embodiment of the present invention, the cemented carbide further comprises a cubic phase, sometimes called gamma phase, which is a solid solution of cubic carbides and/or carbonitrides of one or more elements selected from Ti, Ta, Nb, Hf, Zr, V and Cr. The amount of cubic phase, in area % is suitably from 2 to 25%, preferably between 3 to 15%. This can be measured in different ways but one way is to perform an image analysis of either a Light Optical Microscope image or a Scanning Electron Microscope (SEM) micrograph of a cross section of the substrate to calculate the average fraction of gamma phase.

In one embodiment of the present invention, the cemented carbide comprises a cubic phase and a binder phase enriched surface zone depleted from cubic phase. The thickness of the surface zone is suitably from 2 to 100 μm, preferably from 3 to 70 μm and more preferably from 8 to 35 μm. The thickness is determined by measuring on a SEM or LOM image of a cross section of the substrate. Those measurements should be performed in areas where the substrate surface is reasonably flat, i.e. not close to the edge, at least 0.3 mm from the cutting edge, or nose etc. in order to get a true value. The boundary between the surface zone and the bulk is determined by the absence/presence of cubic phase which is usually quite distinct when observing a cross-section of the substrate in a SEM or LOM image. The thickness is determined by the distance between the surface and the boundary between the surface zone and the bulk. By binder enriched is herein meant that the binder phase content in the surface zone is suitably from 1.05 to 1.65 times, preferably from 1.1 to 1.5 times the binder phase content in the bulk.

The binder phase content in the surface zone is suitably measured at a depth of half the total thickness/depth of the surface zone. All measurements performed on the bulk should be performed at an area not too close to the surface zone. By that is herein meant that any measurements done to the microstructure of the bulk should be performed at a depth of at least 200 μm from the surface.

By surface zone depleted of cubic phase is herein meant that the surface zone contains no, or very few cubic phase particles, i.e. less than 0.5 area %.

In one embodiment of the present invention the cutting tool is provided with a coating. The coating can be a colour layer or a wear resistant coating.

In one embodiment of the present invention the thickness of the coating is 2-20 μm, preferably 5-10 μm.

In one embodiment of the present invention the cutting tool comprises a coating, and wherein the thickness of the coating in the area of the hardness measurement is 3-12 μm and preferably less than 6 μm.

In one embodiment of the present invention the coating is a CVD coating or a PVD coating, preferably said coating comprising one or more layers selected from TiN, TiCN, TiC, TiAlN, $Al_2O_3$ and ZrCN. The coating is preferably a CVD coating comprising a TiCN layer and a $Al_2O_3$ layer.

In one embodiment of the present invention, the coating is a CVD coating comprising an inner TiCN layer and an outer $\alpha$-$Al_2O_3$ layer.

In one embodiment of the present invention, the cemented carbide substrate is provided with a wear resistant PVD coating, suitably being a nitride, oxide, carbide or mixtures thereof of one or more of the elements selected from Al, Si and groups 4, 5 and 6 in the periodic table.

In one embodiment of the present invention the cutting tool comprises a rake face, a flank face and a cutting edge there between, and wherein said shot peening is performed at least on the rake face. Rake face peening is advantageous in that it is at the rake face that the working material hits the cutting tool during the cutting operation and that the mechanisms during peening that is influencing the substrate is therefore applied at a relevant area or volume of the substrate. It is further advantageous to apply the shot peening at the rake face since for many cutting tool geometries this imply treating several cutting edges at the same time.

In one embodiment of the present invention the shot peening is performed with a ceramic beads, preferably beads comprising $ZrO_2$, $SiO_2$ and $Al_2O_3$.

In one embodiment of the present invention the shot peening is performed with a peening media of an average diameter of 70-150 µm. If the beads are too large the risk of damaging the cutting edge is increased. If the beads are too small the energy and impact transferred from the media to the substrate is less pronounced. The impact or energy from the beads during the shot peening should not be too high since this would increase the risk of damaging the surface and the cutting edge of the cutting tool. The impact or energy from the beads should neither be too low since then the technical effect would not be achieved. If the beads are too large the risk of damaging the cutting edge is increased. If the beads are too small the energy and impact transferred from the media to the substrate is less pronounced. A suitable size of the beads is related to the material of the beads and is to be selected by the skilled person.

In one embodiment of the present invention the shot peening is performed on heated cutting tools, the method comprises a step prior to the shot peening wherein said cutting tools are heated.

In one embodiment of the present invention the method further comprises a step of shot blasting at least a portion of the cutting tool. Preferably the portion includes at least a section of the cutting edge or an area close to the cutting edge.

In one embodiment of the present invention the step of shot blasting is performed subsequent to the shot peening. The heat during the shot peening can reduce some positive effect from the shot blasting, such as residual stress induction in a coating, so by choosing to do the shot peening before the shot blasting both positive effects can be maintained.

In one embodiment of the present invention the shot blasting and the shot peening are performed on the same portions of the cutting tool. This is advantageous for example during a production in large scale due to a more effective loading of the cutting tools.

In one embodiment of the present invention the peening is performed in a shot direction that is perpendicular to the surface of the cutting tool. A perpendicular shot peening is advantageous in that the depth of the impacted substrate is the largest when the heated shot peening is in this direction.

In one embodiment of the present invention, the cutting tool 1 is an insert, preferably a milling insert or a turning insert.

The shot peening process according to the present invention can also be combined with other process steps known in the art of making cutting tools such e.g. brushing, polishing, wet blasting, dry blasting etc.

EXAMPLES

Exemplifying embodiments of the present invention will now be disclosed in more detail and compared to reference embodiments. Coated cutting tools (inserts) were prepared and analyzed.

Example 1 (Sample Preparations)

Cemented carbide substrates were prepared from raw material powders: 0.76 wt % TiC, 0.50 wt % NbC, 2.9 wt % TaC, 1.52 wt % Ti(C,N), 0.02 wt % carbon black and balance WC. The average grain size (FSSS) of the WC was 4 µm. The elements Co, Cr, Fe and Ni were added as 0.99 wt % Co, 2.02 wt % $Cr_3C_2$, 4.85 wt % $Fe_{0.4}Ni_{0.4}Co_{0.2}$. The amount of each raw material is based on the total dry powder weight. The amount of the elements Co, Ni, Fe and Cr were calculated to aim for a CoCrFeNi metallic binder, i.e. an atomic ratio of 1:1:1:1.

The substrates were manufactured according to conventional methods including mixing, milling, spray drying, pressing and sintering. Cutting tools of insert geometry CNMG120408-PM were formed.

During the sintering a cubic carbide free zone of about 20 µm was formed in the surface zone of the substrates.

The cutting tools were coated with a CVD coating process, depositing the layers TiN/TiCN/α-$Al_2O_3$/TiN. The total coating thickness was about 14 µm. The thickness of the lower TiN and the TiCN is about 9 µm in total.

TABLE 1

| | Substrate composition | | | | | | | |
|---|---|---|---|---|---|---|---|---|
| Substrate | Co (wt %) | Cr (wt %) | Fe (wt %) | Ni (wt %) | Ti (wt %) | Ta (wt %) | Nb (wt %) | N (wt %) | WC |
| 1 | 1.976 | 1.737 | 1.857 | 1.954 | 1.8 | 2.72 | 0.44 | 0.1544 | balance |

The total carbon content was measured by chemical analysis using a LECO WC-600 instrument.

TABLE 2

| | Substrate analyse | | | |
|---|---|---|---|---|
| Substrate | Gradient in surface zone [µm] | Carbon content [wt %] | Eta phase/graphite | Porosity |
| 1 | 19.5 | 6.25 | No | A00 |

Coated cutting tools were subjected to shot peening at 500° C. (Invention 1).

The shot peening of the samples was performed in an AUER Manual Blasting Cabinet ST 700 PS equipment. A blasting media of ceramic beads with a spherical shape and an average diameter of about 100 µm was used, media Microblast® 6120. The grain size of the ceramic beads is 63-125 µm. The ceramic beads has a composition of 60-70% $ZrO_2$, 28-33% $SiO_2$ and <10% $Al_2O_3$. The shot gun pressure was set to 5 bar, the working time was set to 20 seconds, the nozzle diameter was 8 mm and the stand-off distance was 100 mm. The peening was applied perpendicular to the rake face of the cutting tools. In the case of heated shot peening the cutting tools were heated with an induction coil heater prior to the shot peening and the temperature of the cutting tools were measured with a temperature sensor. The induction heater was a Rimac induction heater, 1.5 kW.

Also, coated cutting tools according to the above that were only shot blasted, i.e. not shot peened, were prepared and are hereinafter called Reference 1.

The cutting edges of the of the cutting tools after these post-treatments were about ER 40 μm.

Vickers Measurements

Vickers indentations were made on rake faces of the cutting tools and on cross sections of the cutting tools. Vickers indentations can also be made at the flank faces.

The coated samples were polished using standard methods so that the TiCN layer was exposed on the rake face of the cutting tool. A bulk sample was prepared by cutting the insert perpendicular to the rake face using a diamond wheel and subsequently polishing using 9 μm diamond dispersed in oil on paper and then 1 μm diamond dispersed in oil.

The Vickers hardness of the polished samples were measured using a programmable hardness tester, KB30S by KB Prüftechnik GmbH. The measurements were calibrated against HV100 using test blocks issued by Euro Products Calibration Laboratory, UK. Vickers hardness was measured according to ISO EN6507.

Vickers hardness measurements were performed by programming the hardness tester to perform indentations at certain positions. Indentations are then performed using the specified load. At least two parallel HV100 indentations were made with a distance from each others of at least 1.5 mm and the presented result is an average value.

The lengths of the cracks at each corner of the Vickers intents were analysed and measured in Olympus BX51M light optical microscopes with a camera and computer. The specimen and camera were oriented so that the diagonals of the Vickers indents were horizontal and vertical on the computer screen. A magnification of at least 100 times was used. If the tip of the crack was difficult to find, a higher magnification was applied to locate the tip of the crack before measurement. The two diagonals of each indent were measured, and the cracks were measured as the projection onto extended diagonals of the indents from respective indent corner to the crack tip.

Residual Stress Measurements

X-ray diffraction was used to determine residual stresses in the aforementioned samples through the so-called $\sin^2\psi$-method. In this method the shift of lattice spacings d (and hence the strains) are measured as a function of sample tilt angles iv. The residual stresses are obtained from the linear slope of the strain vs $\sin^2\psi$ curve. Residual stresses are converted from strain values by using X-ray elastic constants.

The XRD measurements were performed on a Bruker Discover D8 diffractometer with Davinci design equipped with a 1 μS Microfocus Source (CuK$_a$ radiation, $\lambda$=1.5418 Å), a Våntec-500 area detector and an ¼ Eulerian cradle. The (2 1 1) reflection of WC located at 117.32° 2θ was used for strain measurements. The residual stress measurements were performed in 1 to 4 angular directions, φ: 0°, 90°, 180°, 270° and for each φ-direction 10 equidistant ψ-angles (0°-50°) were measured, measurement time 400 s. A collimator with 1.0 mm diameter was used in all measurements.

The resulting residual stresses were obtained from strain data by using X-ray elastic constants for WC, Bragg peak (2 1 1). The X-ray elastic constants where calculated from Poisson's ratio v=0.191 and Young's modulus=717.360 GPa.

The samples were mounted with adhesive tape to the sample holder.

The XRD data were analyzed with software DIFFRAC EVA (Bruker) and High Score Plus (Malvern Panalytical). Software LEPTOS 7 (Bruker) was used in the residual stress analysis.

TABLE 3

| Sample | Shot peening | H(rake) [HV100] | H(bulk) [HV100] | Mean crack length rake [μm] | Mean crack length bulk [μm] | Residual stress (rake) [MPa] |
|---|---|---|---|---|---|---|
| Invention 1 | At 500° C. | 1643 | 1576 | 263 | 344 | −2633 |
| Reference 1 | No | 1631 | | 408 | | −1302 |

TABLE 4

| Sample | Shot peening | W(rake) [N/μm] | W(bulk) [N/μm] | H * W (rake) [HV100*N/μm] | H * W (bulk) [HV100*N/μm] |
|---|---|---|---|---|---|
| Invention 1 | At 500° C. | 0.93 | 0.71 | 1534 | 1120 |
| Reference 1 | No | 0.60 | | 981 | |

While the invention has been described in connection with various exemplary embodiments, it is to be understood that the invention is not to be limited to the disclosed exemplary embodiments, on the contrary, it is intended to cover various modifications and equivalent arrangements within the appended claims. Furthermore, it should be recognized that any disclosed form or embodiment of the invention may be incorporated in any other disclosed or described or suggested form or embodiment as a general matter of design choice. It is the intention, therefore, to be limited only as indicated by the scope of the appended claims appended hereto.

The invention claimed is:

1. A cutting tool comprising:
   a substrate of cemented carbide, wherein the cemented carbide comprises hard constituents in a metallic binder, wherein the hard constituents include WC and wherein the WC content in the cemented carbide is 80-95 wt %, and wherein the cemented carbide has a Fe+Ni+Co+Cr content of 3-13 wt %, an atomic ratio of 0.05<Fe/(Fe+Ni+Co+Cr)<0.35, an atomic ratio of 0.05<Ni/(Fe+Ni+Co+Cr)<0.35, an atomic ratio of 0.05<Co/(Fe+Ni+Co+Cr)<0.35 and an atomic ratio of 0.05<Cr/(Fe+Ni+Co+Cr)<0.35; and
   a rake face, a flank face and a cutting edge there between, and wherein a crack resistance W is defined as $$W = \frac{P}{4a}$$

wherein P is a load 100*9.81N of a Vickers hardness indentation and is an average crack length of each crack formed at corners of the Vickers hardness indentation, wherein W as measured on the rake face of the cutting tool is at least 25% higher than the W as measured on a cross section of a bulk area of the cutting tool.

2. The cutting tool of claim 1, wherein compressive residual stress as measured in a surface area on the rake face of the cutting tool is >2000 MPa, and wherein stress measurement is made with X-ray diffraction and the $\sin^2\psi$-method using (2 1 1) reflection of WC.

3. The cutting tool of claim 1, wherein a relation between the crack resistance W as measured on the rake face, W(rake), and the crack resistance W as measured on the flank, W(flank), is W(rake)/W(flank)>1.10.

4. The cutting tool of claim 1, wherein a hardness at a surface of the cutting tool is >1500 HV100.

5. The cutting tool of claim 1, wherein the cemented carbide has an atomic ratio of 0.2<Fe/(Fe+Ni+Co+Cr)<0.3, an atomic ratio of 0.2<Ni/(Fe+Ni+Co+Cr)<0.3, an atomic ratio of 0.2<Co/(Fe+Ni+Co+Cr)<0.3, and an atomic ratio of 0.2<Cr/(Fe+Ni+Co+Cr)<0.3.

6. The cutting tool of claim 1, wherein the average WC grain size is 0.2-10 µm.

7. The cutting tool of claim 1, wherein the cemented carbide further comprises one or more of Cu, W, Mo, Mn, Al, Si, Ta, Nb, Ti, Zr, Hf, and V.

8. The cutting tool of claim 1, wherein the substrate of cemented carbide has a cubic phase and wherein the substrate of cemented carbide is provided with a surface zone depleted from said cubic phase, a thickness of the surface zone being 2-100 µm.

9. The cutting tool of claim 1, wherein the substrate of cemented carbide is provided with a coating, the coating including one or more layers selected from TiN, TiCN, TiC, TiAlN, $Al_2O_3$ and ZrCN, the coating having a thickness of 2-20 µm.

10. The cutting tool of claim 1, wherein a hardness in the surface area and a hardness in the bulk area of the cutting tool is the same within a 10% deviation.

11. The cutting tool of claim 1, wherein an edge radius, ER, of at least a part of said cutting edge is between 10 µm and 50 µm.

12. A method of treating a cutting tool according to claim 1, the the cutting tool comprising the cemented carbide substrate, wherein the cemented carbide comprises hard constituents in metallic binder, wherein the hard constituents include WC and wherein the WC content in the cemented carbide is 80-95 wt %, wherein the cemented carbide has Fe+Ni+Co+Cr content of 3-13 wt %, the atomic ratio of 0.05<Fe/(Fe+Ni+Co+Cr)<0.35, the atomic ratio of 0.05<Ni/(Fe+Ni+Co+Cr)<0.35, the atomic ratio of 0.05<Co/(Fe+Ni+Co+Cr)<0.35, and the atomic ratio of 0.05<Cr/(Fe+Ni+Co+Cr)<0.35, the method comprising subjecting the cutting tool to shot peening at a temperature of or above 100° C.

13. The method according to claim 12, wherein the shot peening is performed at least on the rake face.

14. The method according to claim 12, wherein the cutting tool is heated, and the shot peening is performed on the heated cutting tool.

15. The method according to claim 12, further comprising a step of shot blasting at least a portion of the cutting tool, wherein the step of shot blasting is performed subsequent to the shot peening.

* * * * *